(12) United States Patent
Brothers

(10) Patent No.: US 7,668,560 B2
(45) Date of Patent: Feb. 23, 2010

(54) METHOD AND APPARATUS FOR ACCESSING NETWORK ISOLATED DEVICES

(75) Inventor: Michael J. Brothers, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 552 days.

(21) Appl. No.: 11/440,666

(22) Filed: May 25, 2006

(65) Prior Publication Data

US 2007/0274241 A1    Nov. 29, 2007

(51) Int. Cl.
*H04B 7/00* (2006.01)
*H04Q 7/20* (2006.01)

(52) U.S. Cl. .................. 455/515; 455/517; 455/557; 455/458

(58) Field of Classification Search ............. 455/466, 455/550.1, 445, 433, 67.11, 557, 41.1–2, 455/556.1–2, 435.1, 517, 514, 515, 516, 455/414.4, 426.1, 458, 41.2, 414.1; 370/310, 370/437, 335; 707/104.1
See application file for complete search history.

(56) References Cited

U.S. PATENT DOCUMENTS 6,775,298 B1 * 8/2004 Aggarwal .................. 370/473

2002/0109859 A1    8/2002 Tipirneni
2003/0028672 A1 * 2/2003 Goldstein ................. 709/246
2004/0225762 A1 * 11/2004 Poo ............................ 710/36

FOREIGN PATENT DOCUMENTS

EP    1309127 A1    5/2003

OTHER PUBLICATIONS

International Search Report, International Application No. PCT/US2007/060385, Date of Mailing: Feb. 25, 2008.

* cited by examiner

*Primary Examiner*—John Lee
(74) *Attorney, Agent, or Firm*—Coats & Bennett, P.L.L.C.

(57) ABSTRACT

A first communication device without direct network access sends a message to a second communication device connected to a remote network by relaying the message through one or more mobile communication devices. In one embodiment, a mobile communication device comprises a wireless communication circuit configured to establish a temporary wireless communication connection with the network isolated device and to receive data transferred via the temporary wireless communication connection. Further, the wireless communication circuit is configured to terminate the temporary wireless communication connection, to establish a subsequent communication connection with a communication device and to transfer the data to the communication device via the subsequent communication connection. According to some embodiments, a user of the device is offered an incentive to enable the device to transfer the data.

19 Claims, 7 Drawing Sheets

METHOD AND APPARATUS FOR ACCESSING NETWORK ISOLATED DEVICES

BACKGROUND

The present invention relates to a system and method of communicating data from network isolated devices to remote devices connected to communication networks.

The wide-spread deployment of various wireless communication technologies has vastly increased the network accessibility of remote devices, thus improving communication coverage and information access. For example, various short and long-range wireless communication technologies enable remote devices to communicate and share information. Despite the rapid expansion of wireless network coverage, the location of some devices still prevents the devices from gaining access to a network, e.g., through a network access point. Such network isolated devices, i.e., devices whose location prevents direct access to communication networks may lack direct network connectivity for various reasons, e.g., poor line of sight, lack of network coverage, shielding, weak signal strength, distance, reception sensitivity, multi-path or null points, etc.

As devices become more 'intelligent', e.g., by having various computer and electronic components included in them, there becomes an increasing need to access, monitor and communicate with network isolated devices. For example, designers and/or operators of intelligent devices located in network isolated areas may want to verify proper device operation, upgrade software code, access data generated by such devices, and transfer data to such devices. Of particular interest to device designers and/or operators may be telemetry data generated by network isolated devices, e.g., information relating to device operating conditions or consumer behavior.

Some network topologies, e.g., mesh-based networks, have expanded wireless network coverage by routing information such as data, voice and instructions between network nodes. Mesh networking maintains continuous connections, thus reconfiguring around blocked paths by "hopping" from node-to-node until a connection can be established. As such, a mesh network remains operational even when a node breaks down or a connection is terminated. Mesh and other similar network topologies utilize knowledge of preexisting nodes to establish signal routing paths. That is, nodes must be known to a mesh network in order for that node to be configured as part of the mesh. In addition, data is dynamically routed between nodes in a mesh network as data is received and while the nodes remain connected to the mesh. Further, isolated nodes such as unknown nodes, disconnected nodes or nodes outside the signal range of a mesh network are isolated from the corresponding mesh network. As such, network isolated devices are communicatively isolated from mesh and other similar network topologies.

SUMMARY

The methods and devices described herein enable a first communication device without direct network access to send a message to a second communication device connected to a remote network by relaying the message through one or more mobile communication devices. The methods and devices take advantage of the ad hoc networking capabilities of mobile communication devices to propagate the message from the network isolated communication device through one or more mobile communication devices to a network access point.

In one embodiment, the network isolated communication device transfers the message to one or more mobile communication devices when the mobile communication devices come within range of the network isolated device. The mobile communication devices receiving the message may relay the message to other mobile communication devices. When one of the mobile communication devices receiving the message comes within the range of a network access point, it establishes communication with the network access point and transfers the message to the network access point. Thus, the message can be relayed from one mobile communication device to another until it reaches a network access point.

To prevent overburdening the network, the relayed message may include an extinction parameter that causes the relayed message to be discarded after a predetermined number of 'hops' or after a predetermined time period has expired. For example, the extinction parameter may correspond to an amount of time elapsed before a mobile communication device relays the message to another mobile device or to a network access point. In another example, the extinction parameter may correspond to a number of mobile communication devices that previously transferred the data. In yet another example, the extinction parameter may correspond to a data relay cancellation message received by a mobile communication device. In still another example, the extinction parameter may correspond to a decay statistic indicating dispersion of the data.

An incentive may be offered to users of mobile communication devices to encourage users to allow their devices to be used for data transfer. For example, an accounting server may be employed that rewards users that allow their mobile communication devices to be used for data transfer. In one embodiment, users of mobile communication devices are offered an incentive to enable their devices for mobile data relay. Those devices that transferred the data are identified. One or more of the devices identified as having transferred the data are then credited, e.g., those devices that formed part of a successful data relay path are credited.

Of course, the present invention is not limited to the above features and advantages. Those skilled in the art will recognize additional features and advantages upon reading the following detailed description, and upon viewing the accompanying drawings.

DETAILED DESCRIPTION

Figure 1:
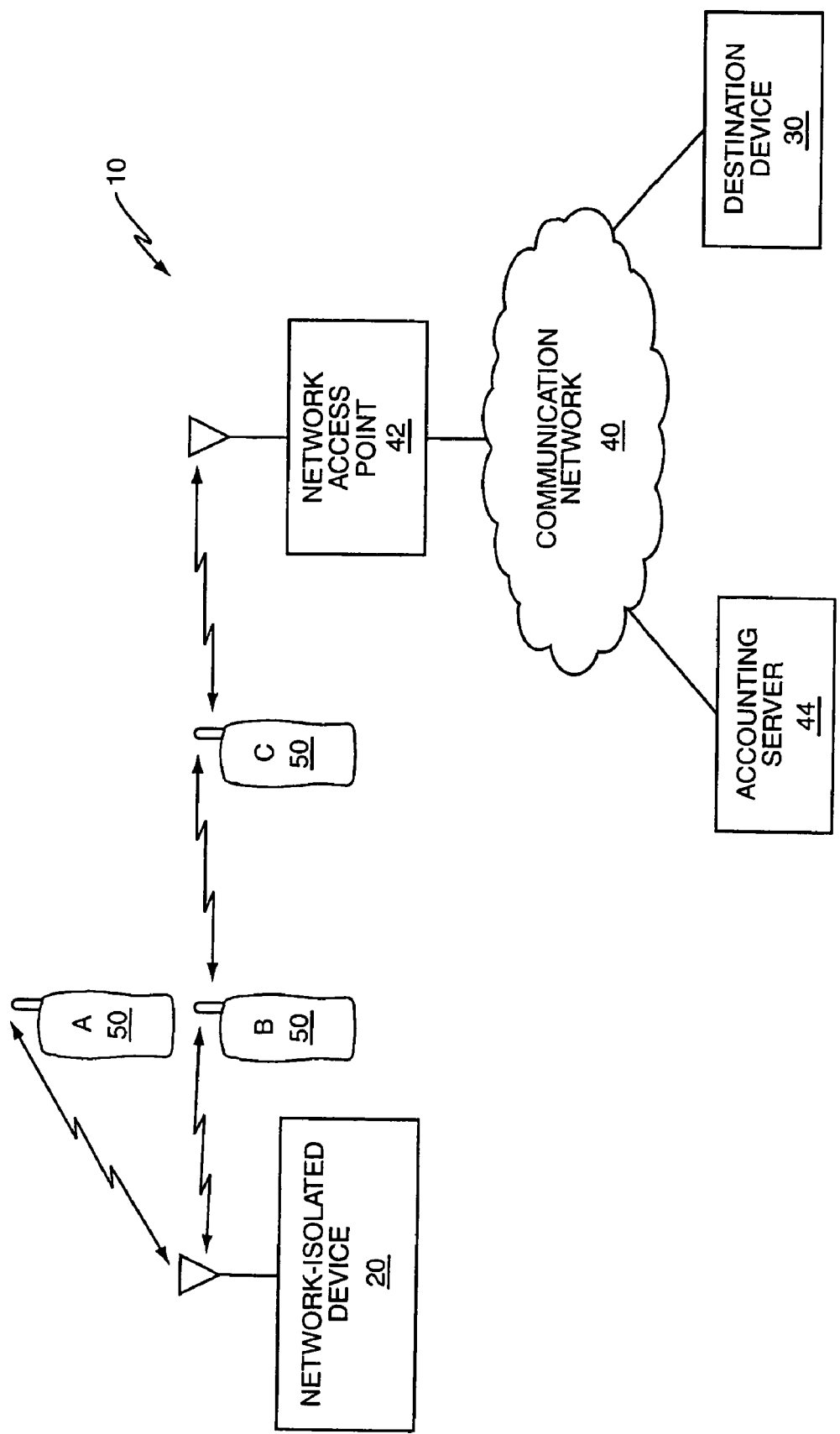
FIG. 1 is a block diagram of an embodiment of a mobile data relay formed between a network isolated communication device and a device connected to a communication network.

FIG. 1 illustrates an exemplary communication system 10 for communicating data from a network isolated device 20 to a destination device 30 connected to a communication network 40. The communication network 40 includes a wireless network access point 42 to enable access to the communication network by mobile communication devices 50, e.g., cell phones, laptops, personal digital assistants, portable computers, etc. The network isolated device 20 is located remotely from the communication network 40 and is thus unable to communicate directly with the network access point 42. As will be hereinafter described in greater detail, the mobile communication devices 50 can form ad hoc networks with like devices and may be recruited by the network isolated device 20 to relay messages from the network isolated device 20 to the network access point 42. Messages from the network isolated device 20 reaching the network access point 42 are then routed to the destination device 30 via conventional routing mechanisms. An accounting server 44 connected to the network 40 performs accounting functions so that the mobile communication devices 50 can receive credits for relaying messages.

To send data to the destination device 30, the network isolated device 20 transfers data addressed to the destination device 30 to one or more mobile communication devices 50 that come within range. The mobile communication devices 50 receiving the message may relay the message to other mobile communication devices 50. When one of the mobile communication devices 50 receiving the message comes within the range of the network access point 42, it establishes communication with the network access point 42 and transfers the message to the network access point 42. Thus, the message can be relayed from one mobile communication device 50 to another until it reaches the network access point 42.

Figure 2:
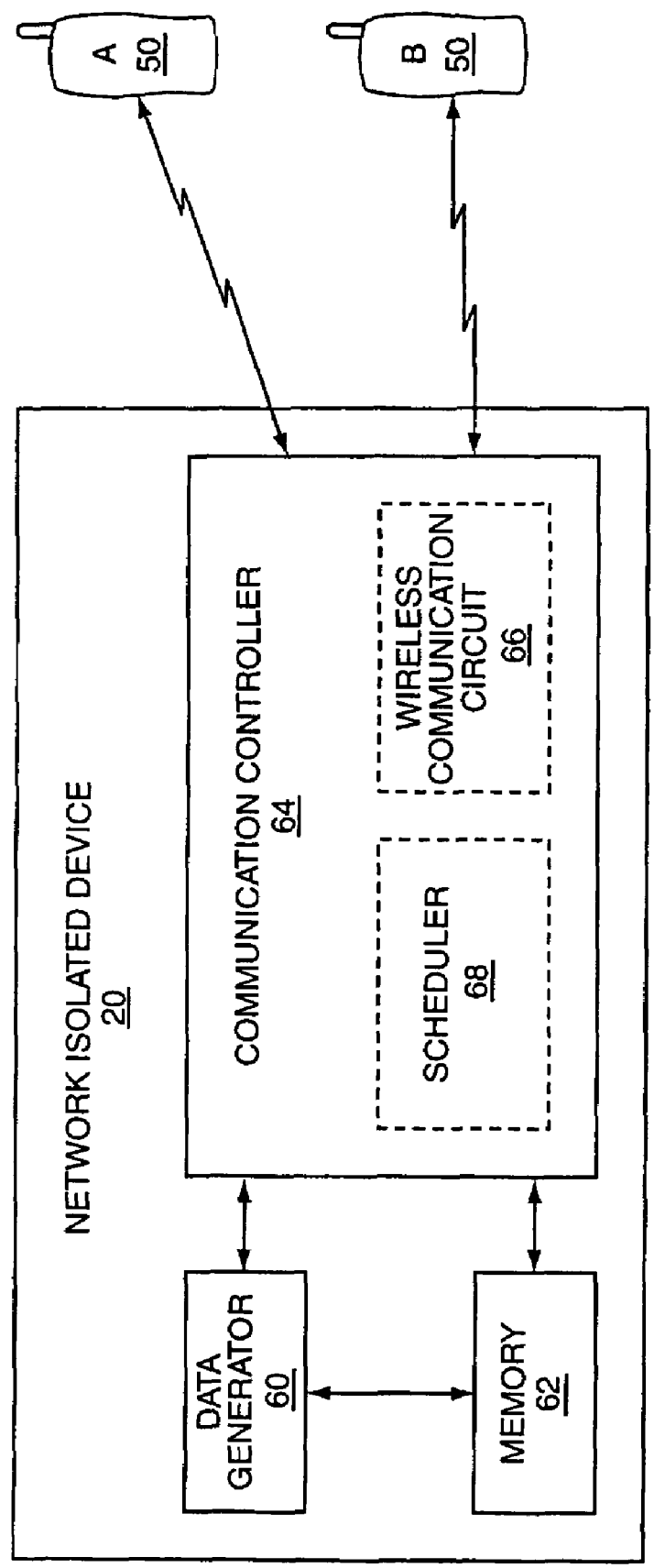
FIG. 2 is a block diagram of an embodiment of a network isolated communication device.

FIG. 2 illustrates one embodiment of the network isolated device 20. The network isolated device 20 is connected to or includes a data generator 60, memory 62 and a communication controller 64. Memory 62 stores data produced by the data generator 60 as well as other information, e.g., program code. The data generator 60 originates any type of information that may be reported to the destination device 30, e.g., telemetry data. The data generator 60 may comprise any suitable components for generating reportable data such as interactive displays, Input/Output (I/O) devices, sensors, software, etc. The communication controller 64 establishes wireless communication connections with mobile communication devices 50 that come within range of the network isolated device 20. The communication controller 64 in the exemplary embodiment comprises a wireless communication circuit 66 and a scheduler 68. The wireless communication circuit 66 establishes temporary wireless communication connections with one or more in-range mobile communication devices 50 while the scheduler 68 determines how often and how many wireless communication connections are established.

In more detail, the wireless communication circuit 66 comprises any suitable circuitry that transmits and receives wireless signals, e.g., a wireless transmitter and receiver or a wireless transceiver. Regardless of the particular circuit configuration, the wireless communication circuit 66 establishes a temporary wireless communication connection with one or more in-range mobile communication devices 50. Using the BLUETOOTH protocol as a purely illustrative example, the communication circuit 66 forms a wireless communication link over a radio channel that exists between the network isolated device 20 and one or more in-range BLUETOOTH-compatible mobile communication devices 50. Each link, which comprises a control and signaling logical link, transports data between the network isolated device 20 and the mobile communication device 50. Higher-level application and service protocol functions such as reassembly of application data may be implemented by the communication controller 64, or alternatively, by other components (not shown) included in the network isolated device 20. Those skilled in the art will readily recognize that the network isolated device 20 may implement other wireless communication protocols for communicating with in-range mobile communication devices 50, e.g., Ultra-WideBand (UWB), Institute of Electrical and Electronics Engineers (IEEE) 802.11 Wireless Fidelity (WiFi), IEEE 802.16 Worldwide Interoperability for Microwave Access (WiMax), Wireless Broadband (WiBro), Infrared (IrDA), Radio Frequency Identification (RFID), Near Field Communication (NFC), HiperLAN, HiperMAN, IEEE 802.20, IEEE 802.15.4 (ZigBee), or the like, each of which are well known in the art.

The scheduler 68 determines the appropriate times for transferring data according to predetermined criterion. For example, the scheduler 68 may schedule transmissions at predetermined intervals, e.g. once per week, or when predetermined events occur. The scheduler 68 may also determine the number of mobile communication devices 50 that should receive the data for each data transfer. For example, it may be desirable to transfer the same data to multiple mobile communication devices 50 in order to ensure a predetermined probability of successful transmission. Scheduling decisions by the scheduler 68 may be based on one or more distribution parameters that specify how often data is to be transferred and how many mobile communication devices to use. The distribution parameters may be stored in memory 62 and may be dynamically updated depending on changing conditions.

Figure 3:
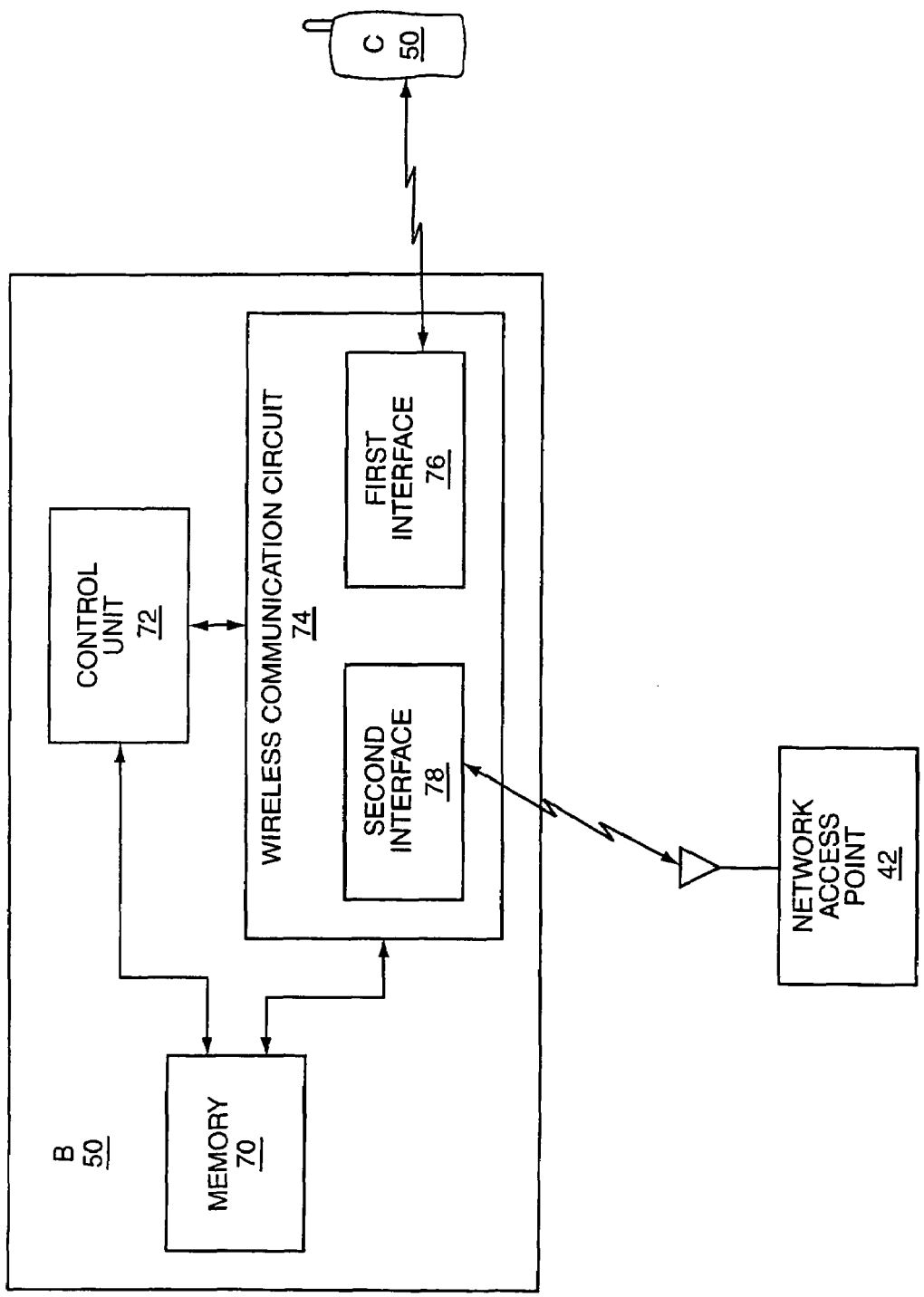
FIG. 3 is a block diagram of an embodiment of a mobile communication device.

FIG. 3 illustrates an exemplary mobile communication device 50 for relaying messages originating from the network isolated device 20. The mobile communication device 50 includes memory 70 for storing received data originated from the network isolated device 20, a control unit 72 for controlling operation of the mobile communication device 50, and a wireless communication circuit 74 for enabling communication with external devices. The wireless communication circuit 74 in the exemplary embodiment comprises first and second communication interfaces 76 and 78 for communicating with external devices. Communication interface 76 may, for example, comprises a BLUETOOTH interface and communication interface 78 may comprise a WiFi interface or cellular interface. Those skilled in the art will appreciate that the communication interfaces could employ other communication standards. In the exemplary embodiment shown herein, the BLUETOOTH interface 76 is used to communicate with the network isolated device 20 and other mobile communication devices 50. The WiFi interface 78 is used to communicate with the network access point 42.

Figure 4:
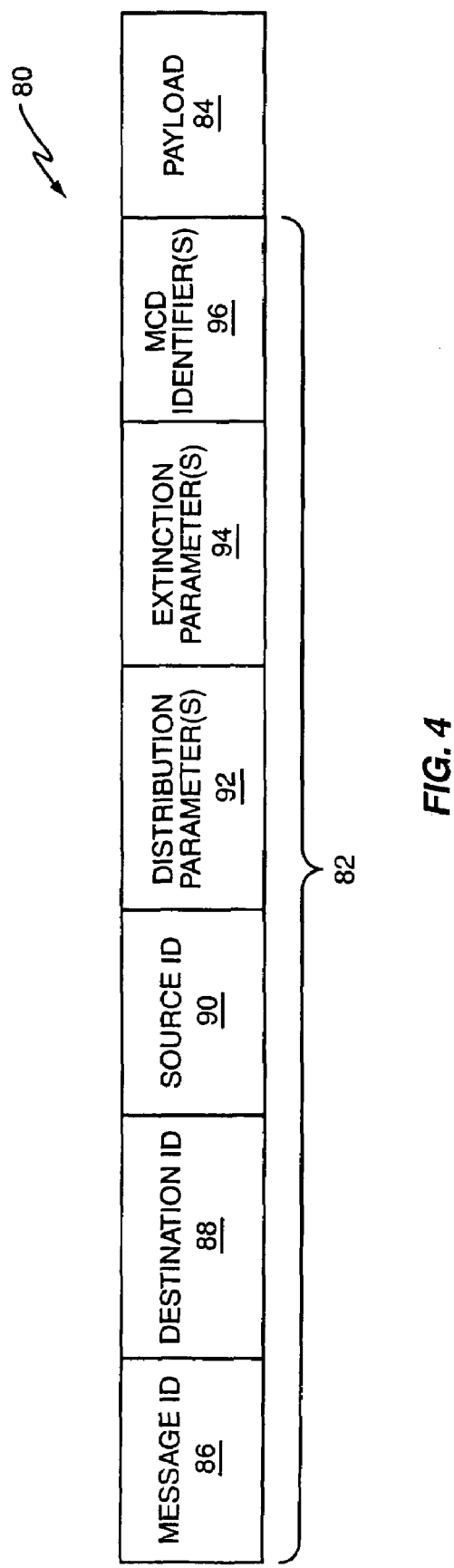
FIG. 4 is a block diagram of an embodiment of a data packet transferred from a network isolated device to a mobile communication device.

Messages sent by the network isolated device 20 may be encapsulated in data packets, as illustrated by the exemplary packet 80 shown in FIG. 4. The packet 80 has a header portion 82 and a payload portion 84. The payload 84 contains the data of interest originated from the network isolated device 20. The header 82 contains a message ID field 86 that uniquely identifies each message transferred by the network isolated device 20, a destination ID field 88 that uniquely identifies the destination device 30, a source ID field 90 that uniquely identifies the network isolated device 20 sending the message, a distribution parameters field 92 containing one or more distribution parameters, an extinction parameters field 94 containing one or more extinction parameters, and a relay device ID field 96 containing device identifiers for the mobile communication devices that have relayed the message. The distribution parameters in the distribution parameter field 92 indicate how a particular message is to be further distributed by mobile communication devices 50. For example, the distribution parameter(s) may specify how many times the mobile communication device should relay the message and the time interval between successive relays.

The extinction parameters in the extinction parameters field 94 indicate when the message relay process should be terminated. For example, the extinction parameter(s) may specify a maximum number of "hops", or a time period when the relay process should be terminated. In one embodiment, the extinction parameter corresponds to an amount of time elapsed before a mobile communication device relays the message to another mobile device or to a network access point. In another embodiment, the extinction parameter corresponds to a number of mobile communication devices that previously transferred the data. In yet another embodiment, the extinction parameter corresponds to a data relay cancellation message received by a mobile communication device. In still another embodiment, the extinction parameter corresponds to a decay statistic such as half-life. For example, if a certain number of devices have transferred a message or the cumulative message transfer time exceeds a predefined limit, the half-life extinction parameter expires. As such, the half-life extinction parameter limits the potentially exponential dispersion of a message in that it limits the quantity of devices or time available for making successive connections.

Figure 5:
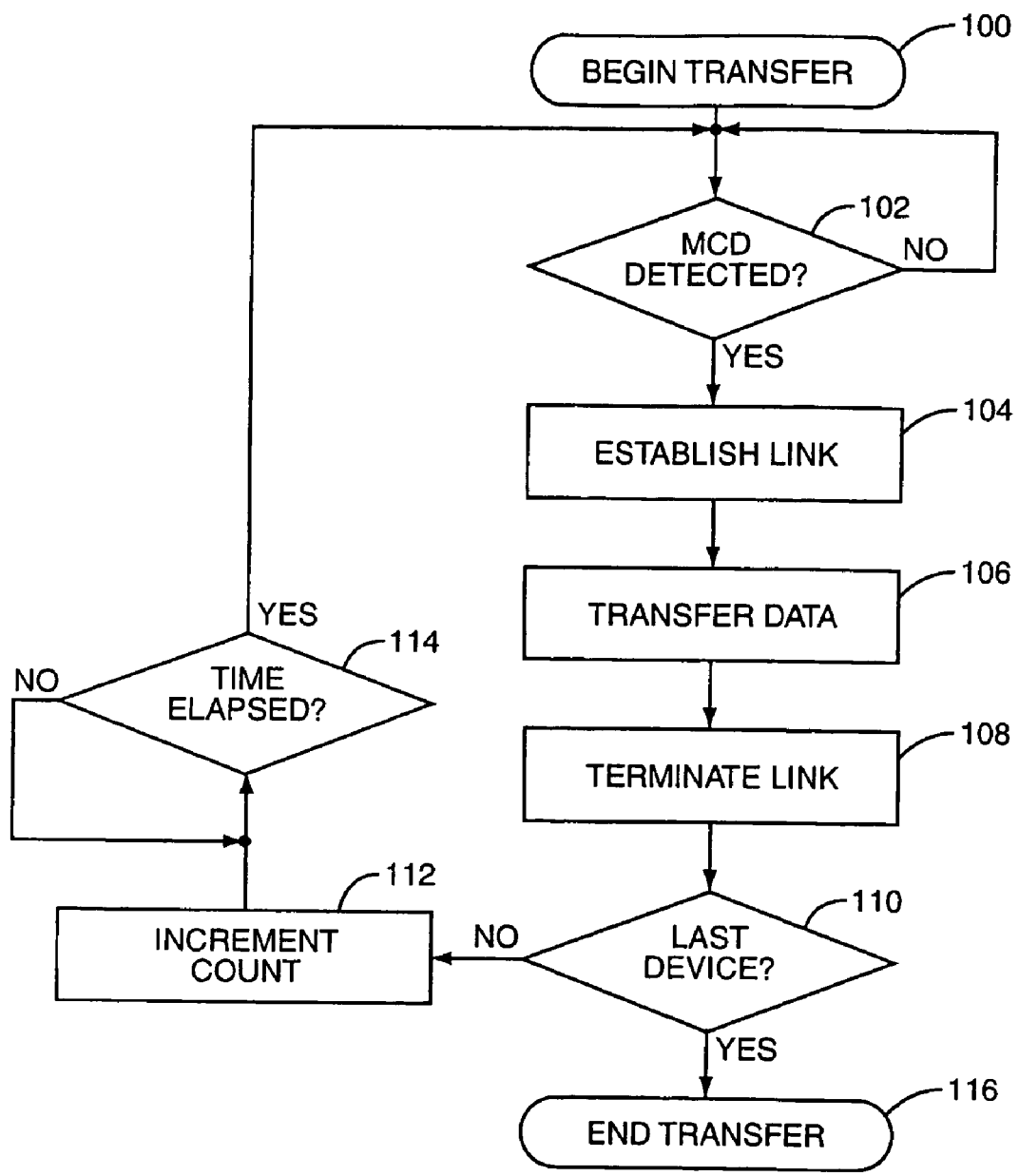
FIG. 5 is a logic flow diagram of an embodiment of processing logic for transferring data from a network isolated device to a mobile communication device.

FIG. 5 illustrates one embodiment of program logic that may be implemented by the network isolated device 20 for transferring a message to one or more in-range mobile communication devices 50. The program logic 'begins' with the network isolated device 20 initiating the data transfer process for a message of interest (Step 100). After the data transfer process is initiated, the network isolated device 20 detects an in-range mobile communication device 50 (Step 102). Once detected, a wireless communication link may be established with the in-range device (Step 104). The message of interest is then transferred to the in-range device via the communication link (Step 106). The communication link is terminated when the message transfer is complete or upon the mobile communication device 50 moving out-of-range of the network isolated device 20, whichever occurs first (Step 108). The scheduler 68 connected to or included in the network isolated device 20 determines whether the message of interest should be transferred to other in-range devices (Step 110). If the message is to be transferred to another in-range device, an incremental counter is increased to reflect the previous message transfer, thus enabling the network isolated device 20 to track the number of devices that it has transferred a particular message to (Step 112). In addition, the scheduler 68 may delay subsequent message transfers for a predetermined time, thus enabling the network isolated device 20 to transfer messages at predetermined intervals (Step 114). If the message of interest is not to be transferred to another mobile communication device, then the message relay process ends (Step 116).

Figure 6:
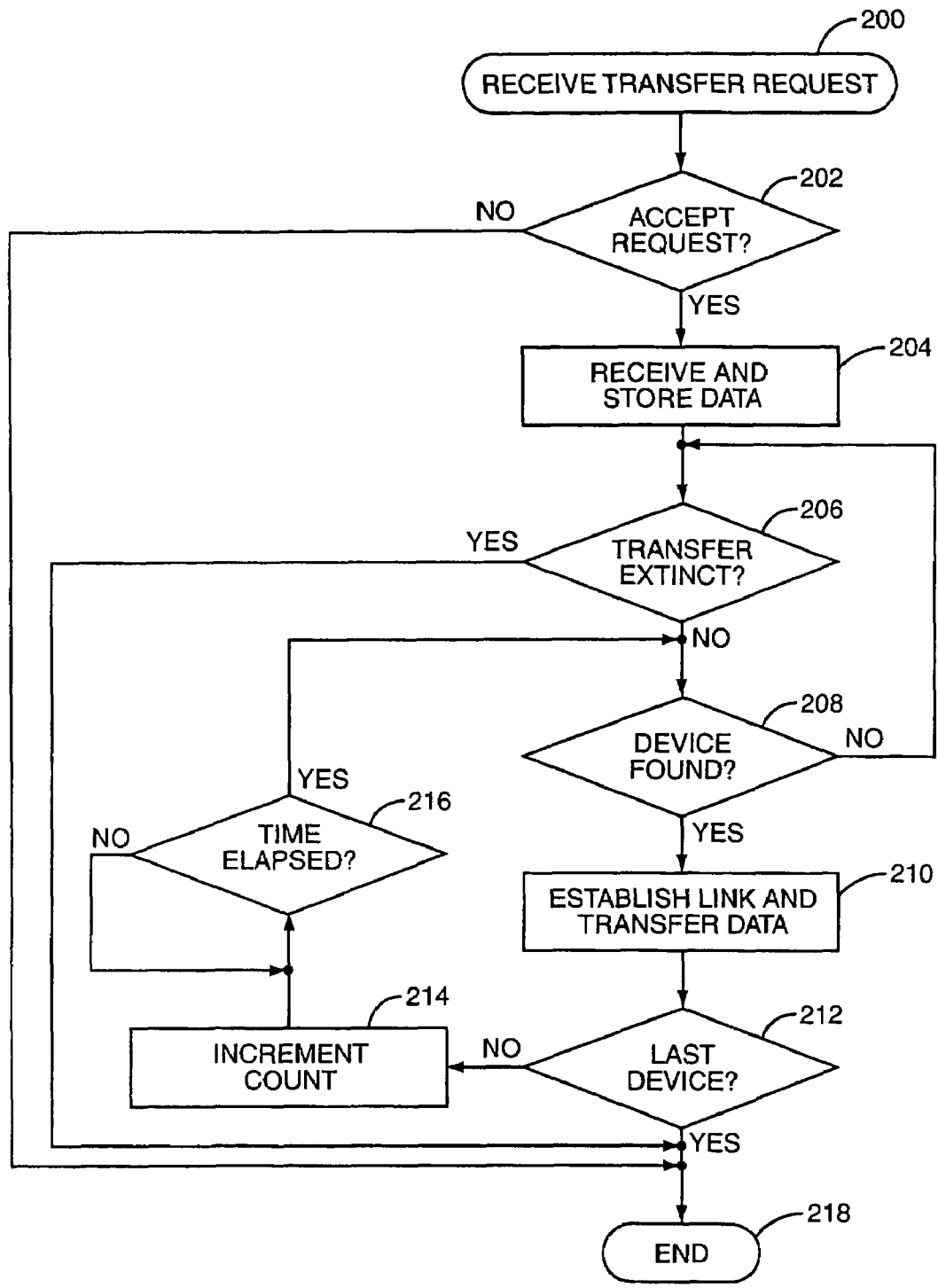
FIG. 6 is a logic flow diagram of an embodiment of processing logic for transferring data by the mobile communication device of FIG. 3.

FIG. 6 illustrates one embodiment of program logic that may be implemented by the mobile communication devices 50 for transferring data originated from the network isolated device 20. The program logic 'begins' with the mobile device 50 receiving a message relay request from the network isolated device 20 or from another mobile communication device (Step 200). The mobile device 50 determines whether to accept the message transfer request (Step 202). If the mobile device 50 accepts the request, it receives the data via a wireless communication link and stores the data in its memory 70 (Step 204). The mobile device 50 periodically evaluates one or more extinction parameters to determine whether the message relay process should continue or should be terminated (Step 206). If the extinction parameter indicates that the message relay process should continue, the mobile device 50 determines whether it has come within range of another communication device that agrees to accept the message data, e.g., another mobile communication device 50 or a network access point 42 (Step 208). If so, the mobile device 50 establishes a communication link with the other communication device and transfers the data to that device (Step 210). In response to one or more data distribution parameters, e.g., one or more parameters stored in the data transfer distribution field 92, the mobile device 50 then determines whether the message data is to be transferred to another communication device (Step 212). If another data transfer is to occur, the mobile device 50 increments a counter to reflect the previous message transfer, thus tracking the number of transfers completed by the device 50 (Step 214). In addition, the mobile device 50 may also delay subsequent transfer of the message data for a predetermined time in response to another data distribution parameter, thus limiting message transfer frequency (Step 216). If one of the data distribution parameters indicates that the message data is not to be transferred to another communication device, then the message relay process ends (Step 218). Likewise, whenever a data transfer extinction parameter so indicates, the message relay process is terminated (Step 218). In response, the mobile device 50 ceases subsequent transfers of the data and may also delete the data from its memory 70, thus conserving communication bandwidth, reducing signal processing demands and improving memory bandwidth utilization. If the mobile device 50 denies a message transfer request, then the program logic 'ends' (Step 218).

Prior to transferring message data to another communication device, the mobile device 50 may add a mobile communication device identifier 96 uniquely associated with the device 50 to the message, e.g., as part of the header portion 92 of the packet 80 illustrated in FIG. 5. As such, each mobile communication device 50 that transfers data originated from the network isolated device 20 may be subsequently identified. The unique mobile device identifier may be generated by the network 40, the destination device 30 or a corresponding service. In one embodiment, the mobile device 50 includes its International Mobile Equipment Identity (IMEI) code as part of the data transmitted to other communication devices. The mobile device 50 may also transfer its unique mobile communication device identifier to the network isolated device 20 when coupled to the device 20 via a temporary wireless communication connection. The network isolated device 20 may store the unique device identifiers for subsequent use, e.g., to track data transfer success rates or to identify one or more of the mobile devices 50 to which the network isolated device 20 directs a data transfer termination message.

Figure 7:
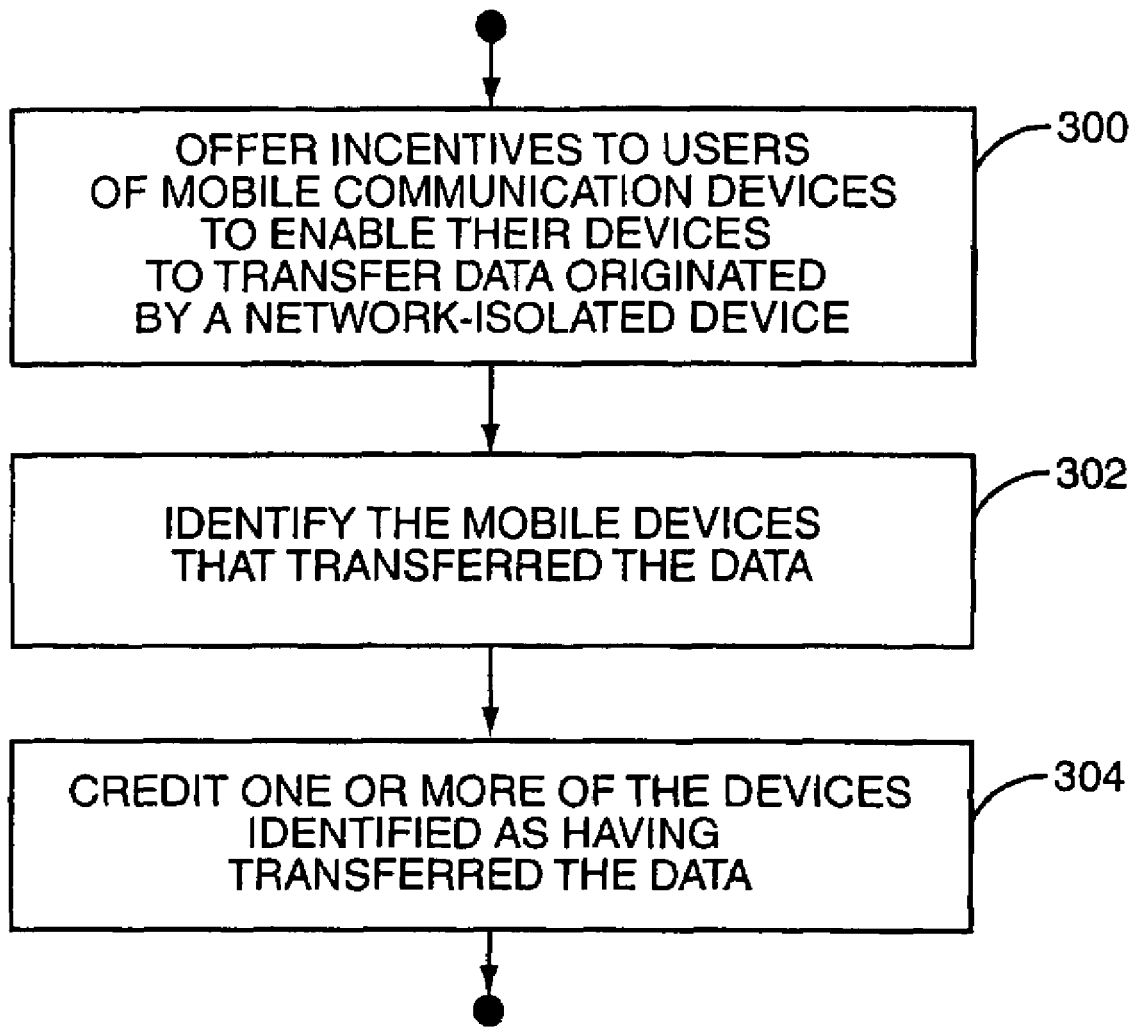
FIG. 7 is a logic flow diagram of an embodiment of a method for incentivizing users of mobile communication devices to enable their devices to form mobile data relays.

FIG. 7 illustrates one method of incentivizing users of mobile devices to enable their devices to transfer data originated from the network isolated device 20. The method 'begins' with offering incentives to users of mobile communication devices 50 to enable their devices 50 to transfer data originated from the network isolated device 20 (Step 300). The incentive may include any suitable mechanism for motivating the user of a mobile device to allow their device to transfer data originated from network isolated devices, e.g., monetary credits, account credits, rebates, access to advanced service features, discounted services, etc. Regardless of the particular incentive offered, the mobile devices 50 that form part of a mobile data relay path by transferring the data are identified (Step 302). The mobile devices 50 transferring the data may be identified by recovering from the received data one or more device identifiers uniquely associated with each mobile communication device that transferred the received data, e.g., IMEI codes, Internet Protocol (IP) addresses, or other unique identifiers. In one embodiment, each device identifier 96 included in the header portion 92 of the packet 80 illustrated in FIG. 5 are processed by the accounting server 44 to identify those mobile devices 50 that transferred the data.

In accordance with the incentive offered, the accounting server 44 then credits the mobile devices 50 identified as having transferred the data (Step 304). In some embodiments, the accounting server 44 credits all mobile devices 50 that transferred the data. That is, a mobile device that transferred the data is credited regardless of whether that device was part of the data relay path that ultimately resulted in successful delivery of the data. In other embodiments, the accounting server 44 credits only those mobile communication devices 50 that formed part of the data relay path that resulted in successful delivery of the data are credited. As such, mobile devices 50 that transferred the data, but did contribute to the data being successfully received by the destination device are not credited. In yet other embodiments, the accounting server 44 may analyze the message ID field 86 of each received message to determine whether duplicate messages were successfully relayed. The accounting server 44 may then credit only those devices that relayed the first instance of a received duplicate message. Alternatively, the accounting server may credit each device or a subset of devices that transferred subsequently received duplicate messages. The accounting server 44 may be included in or associated with the network-connected device 30 or the network access point 42 or may be a separate entity coupled to the communication remote network 40 as shown in FIG. 1.

Optionally, the users of mobile communication devices 50 may be incentivized to transfer data from the network-connected device 30 to the network isolated device 20, e.g., by using a unique identifier associated with the device 20. For example, software upgrades or other information may be transferred to the network isolated device 20 via one or more mobile devices 50. Mobile devices 50 that transferred the data may be credited in accordance with the incentive offered. In one embodiment, the network isolated device 20 may subsequently identify to the network-connected device 30 or to the accounting server 44 which mobile devices successfully relayed the data. The users of those devices may then be credited accordingly.

Thus, while the invention has been described in terms of specific embodiments, it should be understood that the present invention is not limited by the foregoing description, nor is it limited by the accompanying drawings. Instead, the present invention is limited only by the following claims and their legal equivalents.

What is claimed is:

1. A method of transferring data by a network isolated device, comprising:
    generating data for reporting to a remote device;
    establishing a temporary wireless communication connection with a number of mobile communication devices corresponding to a data transfer distribution parameter;
    forming one or more packets including the data, a unique identifier associated with the network isolated device and a data transfer extinction parameter; and
    transferring the one or more packets to the mobile communication devices via the temporary wireless communication connections.

2. The method of claim 1, further comprising storing a unique device identifier received from each mobile communication device to which the network isolated device transferred the one or more packets.

3. The method of claim 2, further comprising directing a termination message to one or more of the mobile communication devices using corresponding ones of the unique device identifiers.

4. The method of claim 1, further comprising receiving different data from one or more of the mobile communication devices.

5. The method of claim 1, wherein the data transfer distribution parameter corresponds to at least one of a frequency of data transfers and a number of mobile communication devices.

6. The method of claim 1, wherein establishing a temporary wireless communication connection with a number of mobile communication devices corresponding to a data transfer distribution parameter and transferring the one or more packets to the mobile communication devices via the temporary wireless communication connections comprises periodically establishing the temporary wireless communication connections and periodically transferring the one or more packets.

7. A network isolated device, comprising a communication controller configured to establish a temporary wireless communication connection with a number of mobile communication devices corresponding to a data transfer distribution parameter, to form one or more packets including data generated by the network isolated device, a unique identifier associated with the network isolated device and a data transfer extinction parameter and to transfer the one or more packets to the mobile communication devices via the temporary wireless communication connections.

8. The network isolated device of claim 7, wherein the communication controller is further configured to direct storage of a unique device identifier received from each mobile communication device to which the network isolated device transferred the one or more packets.

9. The network isolated device of claim 8, wherein the communication controller is further configured to direct a termination message to one or more of the mobile communication devices using corresponding ones of the unique device identifiers.

10. The network isolated device of claim 7, wherein the communication controller is further configured to receive different data from one or more of the mobile communication devices.

11. The network isolated device of claim 7, wherein the data transfer distribution parameter corresponds to at least one of a frequency of data transfers and a number of mobile communication devices.

12. The network isolated device of claim 7, wherein the communication controller is configured to periodically establish the temporary wireless communication connections and to periodically transfer the one or more packets.

13. A method of incentivizing users of mobile communication devices to enable the mobile communication devices to transfer data originated from a network isolated device, comprising:
    offering an incentive to the users of the mobile communication devices to enable the mobile communication devices to transfer data originated from the network isolated device;
    identifying the mobile communication devices that transfer the data by recovering from data received by a destination device one or more device identifiers uniquely associated with each mobile communication device that transferred the data received by the destination device; and crediting one or more of the mobile communication devices identified as having transferred the data.

14. The method of claim 13, wherein crediting one or more of the mobile communication devices that transferred the data comprises crediting each mobile communication device that transferred data received by a destination device.

15. The method of claim 13, wherein identifying the mobile communication devices that transfer the data further comprises recovering from the data received by the destination device one or more message identifiers uniquely associated with each message originated from the network isolated device.

16. The method of claim 13, further comprising incentivizing the users of the mobile communication devices to enable the mobile communication devices to transfer different data to the network isolated device.

17. The method of claim 16, further comprising crediting one or more of the mobile communication devices that transfer the different data.

18. The method of claim 17, wherein crediting one or more of the mobile communication devices that transfer the different data comprises:

identifying the mobile communication devices that transferred the data; and crediting one or more of the identified mobile communication devices.

19. The method of claim 18, wherein identifying the mobile communication devices that transferred the data comprises recovering from data received by the network isolated device one or more device identifiers uniquely associated with each mobile communication device that transferred the data received by the network isolated device.

* * * * *